US012712225B2

(12) United States Patent
Cai et al.

(10) Patent No.: US 12,712,225 B2
(45) Date of Patent: Aug. 18, 2026

(54) TAB COATING DEVICE

(71) Applicant: CONTEMPORARY AMPEREX TECHNOLOGY (HONG KONG) LIMITED, Hong Kong (CN)

(72) Inventors: Fukang Cai, Ningde (CN); Zhenfei Yang, Ningde (CN); Yueming Xu, Ningde (CN); Wenqi Zhu, Ningde (CN); Kun Jin, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 114 days.

(21) Appl. No.: 18/754,191

(22) Filed: Jun. 26, 2024

(65) Prior Publication Data

US 2024/0347883 A1 Oct. 17, 2024

Related U.S. Application Data

(63) Continuation of application No. PCT/CN2022/126229, filed on Oct. 19, 2022.

(30) Foreign Application Priority Data

May 23, 2022 (CN) ......................... 202221229605.4

(51) Int. Cl.
*H01M 50/169* (2021.01)
*H01M 50/474* (2021.01)
*H01M 50/586* (2021.01)

(52) U.S. Cl.
CPC ....... *H01M 50/169* (2021.01); *H01M 50/474* (2021.01); *H01M 50/586* (2021.01)

(58) Field of Classification Search
CPC ............. H01M 50/586; H01M 50/474; H01M 50/107; H01M 50/167; H01M 50/169;
(Continued)

(56) References Cited

U.S. PATENT DOCUMENTS 9,627,657 B2 4/2017 Sumiyama et al.
2013/0029212 A1 1/2013 Hong
2015/0024258 A1* 1/2015 Sumiyama .......... H01M 50/171 429/174

FOREIGN PATENT DOCUMENTS

CN 108054305 A 5/2018
CN 109713171 A 5/2019
(Continued)

OTHER PUBLICATIONS

Extended European Search Report, mailed Jun. 13, 2025, for corresponding European Patent Application Serial No. 22943471.7.
(Continued)

*Primary Examiner* — John L Goff, II
(74) *Attorney, Agent, or Firm* — K&L Gates LLP

(57) ABSTRACT

Provided are a tab coating device. The tab coating device is configured to cover the insulating film on the end face of the tab of the tab coating device. It comprises a sleeve and a shaping piece. The sleeve is configured to be arranged on the outer peripheral surface of the electrode assembly in a sleeving mode. The shaping piece is configured to move along the axial direction of the sleeve and extend into the sleeve, to flatten the part of the insulating film that exceeds the end face of the tab onto the end face of the tab.

13 Claims, 10 Drawing Sheets

(58) Field of Classification Search
CPC ........... H01M 50/171; H01M 10/0431; H01M 10/0422; H01M 10/0404; H01M 50/166; Y02E 60/10; Y02P 70/50; Y10T 156/1049; Y10T 156/1051
USPC ......................................... 156/226, 227, 475
See application file for complete search history.

(56) References Cited

FOREIGN PATENT DOCUMENTS

| | | | | | |
|---|---|---|---|---|---|
| CN | 209691873 | U | | 11/2019 | |
| CN | 111916846 | A | | 11/2020 | |
| CN | 112928400 | A | | 6/2021 | |
| CN | 216928884 | U | | 7/2022 | |
| JP | H083193 | A | * | 1/1996 | |
| KR | 102245124 | B1 | | 4/2021 | |
| WO | WO-2022154373 | A1 | * | 7/2022 | .............. G01P 15/18 |

OTHER PUBLICATIONS

International Search Report received in the corresponding international application PCT/CN2022/126229, mailed on Jan. 18, 2023.
Written Opinion of ISA received in the corresponding international application PCT/CN2022/126229, mailed on Jan. 18, 2023.
Notice of Grant of Utility Model Patent Rights received in the corresponding Chinese Application 202221229605.4, mailed on May 30, 2022.

* cited by examiner 121
120
110
11
20
30

TAB COATING DEVICE

CROSS-REFERENCE TO RELATED APPLICATIONS

The present disclosure is a continuation of International Application No. PCT/CN2022/126229, filed on Oct. 19, 2022, which claims the priority to the Chinese patent application with the filling No. 202221229605.4 filed with the Chinese Patent Office on May 23, 2022, and entitled "Tab coating device", the contents of which are incorporated herein by reference in entirety.

TECHNICAL FIELD

The present disclosure relates to the field of battery production technology, specifically, it relates to a tab coating device.

BACKGROUND ART

Energy conservation and emission reduction are the keys to the sustainable development of the automotive industry, and electric vehicles, due to their advantages in energy efficiency, have become an important component of the sustainable development in the automotive industry. For electric vehicles, battery technology is another crucial factor that affects their development.

In the development of battery technology, how to improve the safety of batteries is a pressing technical issue in battery technology.

SUMMARY

The present disclosure provides a tab coating device, which can enhance the safety of batteries.

The present disclosure is realized by the following technical solutions.

The present disclosure provides a tab coating device configured to coat the end face of a tab of an electrode assembly with an insulating film, comprising a sleeve, configured to be arranged on the outer peripheral surface of the electrode assembly in a sleeving mode; a shaping piece, configured to move along the axial direction of the sleeve and extend into the sleeve to flatten a part of the insulating film that exceeds the end face of the tab on the end face of the tab.

In the technical solution of the embodiments of the present disclosure, the sleeve is arranged around the outer peripheral surface of the electrode assembly in a sleeving mode to constrain the electrode assembly and the insulating film sheathed on the electrode assembly, thus preventing any displacement of the electrode assembly and insulating film. The part of the insulating film that exceeds the end face of the tab is constrained by the sleeve and can be flattened by the shaping piece on the end face of the tab to cover the raised part of the end face of the tab. The raised part of the end face of the tab is insulated from the casing of the battery cell, thus preventing any situation where the raised part of the end face of the tab comes into contact with the casing and causes an internal short circuit within the battery cell. This, in turn, enhances the safety of the battery.

In some embodiments, the inner wall of the sleeve is formed with a protrusion, wherein the protrusion is configured to guide the part of the insulating film that exceeds the end face of the tab to incline toward the central axis of the electrode assembly.

In the technical solution of the embodiments of the present disclosure, before the shaping piece acts on the insulating film, the sleeve moves along the axial direction of the electrode assembly. The protrusion presses against the part of the insulating film that exceeds the end face of the tab, so that the part of the insulating film that exceeds the end face of the tab is deformed from a state parallel to the central axis of the electrode assembly to a state inclined to the central axis of the electrode assembly, that is, inwardly converging toward the center axis of the electrode assembly. When the shaping piece compresses the insulating film, it ensures that the part of the insulating film that exceeds the end face of the tab is flattened on the end face of the tab, thus enabling the raised part of the end face of the tab can be effectively coated by the insulating film. This prevents the raised part of the end face of the tab from coming into contact with the casing, thereby enhancing the safety of the battery.

In some embodiments, the protrusion extends along the circumferential direction of the sleeve.

In the technical solution of the embodiments of the present disclosure, the protrusion extends along the circumferential direction of the sleeve, which means that the protrusion, formed in a ring shape, acts circumferentially on the part of the insulating film that exceeds the end face of the tab. Therefore, each of the parts of the insulating film that exceeds the end face of the tab can be ensured to be inclined toward the central axis of the electrode assembly, so that when the shaping piece compresses the insulating film, this guarantees that the raised part of the end face of the tab can be effectively coated by the insulating film.

In some embodiments, the protrusion has a protrusion height, denoted as H, which satisfies the condition: 2 mm≤H≤2.5 mm.

In the technical solution of the embodiments of the present disclosure, the protrusion has a protrusion height ranging from 2 mm to 2.5 mm, which enables each part of the insulating film that exceeds the end face of the tab can be inclined toward the central axis of the electrode assembly, to avoid the insulation film from not being inclined due to insufficient height of the protrusion and to prevent deformation, caused by excessive protrusion height, of the insulation film along the direction parallel to the central axis of the electrode assembly, thus resulting in an inability to effectively cover the raised part of the end face of the tab. For example, if the protrusion height is too large, it can lead to a reduction in the area of the insulating film covering the end face of the tab, making it ineffective in covering the raised part of the end face of the tab.

In some embodiments, the tab coating device further comprises a first driving member connected to the sleeve, which is configured to drive the sleeve to move along its axial direction.

In the technical solution of the embodiments of the present disclosure, through the driving of the first driving member, the sleeve can be moved along its axial direction, thereby pressing against the part of the insulating film that exceeds the end face of the tab, and guiding each of the parts of the insulating film that exceeds the end face of the tab to incline toward the central axis of the electrode assembly.

In some embodiments, the tab coating device further comprises a second driving member connected to the shaping piece, which is configured to drive the shaping piece to move along the axial direction of the sleeve.

In the technical solution of the embodiments of the present disclosure, driven by the second driving member, the shaping piece can be moved along the axial direction of the sleeve to flatten the part of the insulating film that exceeds the end face of the tab on the end face of the tab, thus covering the raised part of the end face of the tab. This reduces the risk of internal short circuits within the battery cell, thus enhancing the safety of the battery.

In some embodiments, the shaping piece comprises a pressure plate and a connecting rod. The pressure plate is disc-shaped, and the connecting rod is oriented perpendicularly to the pressure plate. One end of the connecting rod is connected to the pressure plate, while the other end is connected to the second driving member.

In the technical solution of the embodiments of the present disclosure, the second driving member is connected to the connecting rod to drive the pressure plate to press the part of the insulating film that exceeds the end face of the tab. Moreover, the pressure plate, being disc-shaped, is effective in flattening the part of the insulating film that exceeds the end face of the tab on the end face of the tab, thus covering the raised part of the end face of the tab.

In some embodiments, the diameter of the pressure plate is smaller than the inner diameter of the protrusion.

In the technical solution of the embodiments of the present disclosure, the diameter of the pressure plate is smaller than the inner diameter of the protrusion, which prevents interference between the pressure plate and the protrusion when the pressure plate moves along the central axis of the sleeve, thus ensuring effective compression of the insulating film.

In some embodiments, the shaping piece is a heat-pressing shaping piece, and the heat-pressing shaping piece is configured to heat-press the part of the insulating film that exceeds the end face of the tab on the end face of the tab.

In the technical solution of the embodiments of the present disclosure, the shaping piece is a heat-pressing shaping piece. By heat-pressing the part of the insulating film that exceeds the end face of the tab, it ensures that the insulating film effectively and consistently covers the raised part of the end face of the tab, thereby enhancing the safety of the battery cell.

In some embodiments, the sleeve is assembled from multiple modules, and the multiple modules are arranged along the circumferential direction of the sleeve.

In the technical solution of the embodiments of the present disclosure, since the insulating film is arranged on the outer peripheral surface of the electrode assembly in a sleeving mode, the insulating film is able to protrude the electrode assembly along the radial direction of the electrode assembly. To avoid damaging the insulating film when the sleeve, along the axial direction of the electrode assembly, is arranged on the electrode assembly in a sleeving mode, the solution applies a sleeve assembled from multiple modules. The multiple modules are arranged along the circumferential direction of the sleeve and can move along the radial direction of the electrode assembly, thus allowing them to be arranged on the electrode assembly in a sleeving mode without damaging the insulating film.

In some embodiments, the tab coating device further comprises a third driving member connected to the multiple modules, which is configured to drive each of the modules along the radial direction of the sleeve, so that the multiple modules are allowed to be closed or opened.

In the technical solution of the embodiments of the present disclosure, driven by the third driving member, the multiple modules can be closed together to be arranged on the electrode assembly in a sleeving mode, or the multiple modules can be opened to remove the electrode assembly.

In some embodiments, the tab coating device also comprises a base. The shaping piece is fixedly arranged on the base, and the sleeve is movably arranged on the base along its axial direction. The shaping piece is located between the base and the sleeve.

In the technical solution of the embodiments of the present disclosure, by arranging a base and securely fixing the shaping piece to the base, and by arranging the sleeve that is movable along its axial direction on the base, it facilitates the operator or a robotic arm to move the electrode assembly and the insulating film, which are constrained by the sleeve, towards the shaping piece. This allows the part of the insulating film that exceeds the end face of the tab to be quickly flattened onto the end face of the tab by the shaping piece, thereby improving the efficiency of the coating process.

In some embodiments, the tab coating device further comprises a resilient member. The resilient member is arranged between the sleeve and the base and is configured to apply elastic force in the direction away from the base to the sleeve.

In the technical solution of the embodiments of the present disclosure, the electrode assembly can be arranged into the sleeve by opening one end of the sleeve away from the base. An operator or a robotic arm can then push the sleeve and/or electrode assembly, allowing the electrode assembly to overcome the elastic force of the resilient member and move towards the shaping piece, thus effectively flattening the insulating film. When the operator or robotic arm releases the pushing force, the sleeve returns to its original position under the action of the resilient member. This facilitates the coating of the next electrode assembly.

In some embodiments, the sleeve is provided with a guide hole, and the tab coating device further comprises a guide pillar. The guide pillar passes through the guide hole and is slidably coordinated with the sleeve along the axial direction of the sleeve. One end of the guide pillar is fixed to the base, and the resilient member is arranged on the guide pillar in a sleeving mode.

In the technical solution of the embodiments of the present disclosure, by providing the guide hole and the guide pillar, the sleeve moves stably along its axial direction. This, in turn, ensures that the insulating film accurately presses against the shaping piece, thus improving the quality of the coating process for the electrode assembly.

In some embodiments, the tab coating device further comprises a limiting part that protrudes from the surface of the base facing the sleeve, which is configured to press against the surface of the sleeve facing the base.

In the technical solution of the embodiments of the present disclosure, by providing the limiting part, the distance in which the sleeve moves towards the base is restricted, thus preventing the breakage of the sleeve or the electrode assembly constrained by the sleeve due to collision impact with the base or the shaping piece. It ensures the longevity of the tab coating device and maintains the safety of the electrode assembly.

In some embodiments, the shaping piece comprises a pressure plate and a connecting rod, wherein the connecting rod is oriented perpendicularly to the pressure plate. One end of the connecting rod is connected to the pressure plate, while the other end is connected to the base.

In the technical solution of the embodiments of the present disclosure, the shaping piece has a simple structure, making it easy to manufacture.

In some embodiments, the pressure plate comprises a supporting disc and a heating sheet. The supporting disc is connected to the connecting rod, and the heating sheet is arranged on the surface of the supporting disc away from the connecting rod. The heating sheet is configured to heat-press the part of the insulating film that exceeds the end face of the tab onto the end face of the tab.

In the technical solution of the embodiments of the present disclosure, by providing the heating sheet, the part of the insulating film that exceeds the end face of the tab is heat-pressed, which ensures that the insulating film effectively and consistently covers the raised part of the end face of the tab, thereby enhancing the safety of the battery cell.

In some embodiments, the heating element is disc-shaped, and the center of the heating sheet forms a positioning hole; the supporting disc is formed with a protrusion block, and the protrusion block is inserted into the positioning hole.

In the technical solution of the embodiments of the present disclosure, through the cooperation of the protrusion block and the positioning hole, it can quickly assemble the heating sheet, thus facilitating the replacement and maintenance of the heating sheet.

In some embodiments, the sleeve comprises a first cylinder and a second cylinder. Along the axial direction of the sleeve, the first cylinder and the second cylinder are connected to each other, wherein the second cylinder, compared with the first cylinder, is closer to the shaping piece. The protrusion is formed on the inner wall of the second cylinder.

In the technical solution of the embodiments of the present disclosure, when the electrode assembly is inserted into the sleeve along the axial direction of the sleeve, the part of the insulating film that exceeds the end face of the tab is affected by the protrusion. On the one hand, the part of the insulating film that exceeds the end face of the tab is deformed from a state parallel to the central axis of the electrode assembly to a state inclined to the central axis of the electrode assembly, that is, inwardly converging toward the center axis of the electrode assembly. When the shaping piece compresses the insulating film, it ensures that the part of the insulating film that exceeds the end face of the tab is flattened on the end face of the tab, thus enabling the raised part of the end face of the tab can be effectively coated by the insulating film. This prevents the raised part of the end face of the tab from coming into contact with the casing, thereby enhancing the safety of the battery. On the other hand, since the protrusion presses against the end of the electrode assembly, the operator or robotic arm can continue to apply force in the same direction after inserting the electrode assembly into the sleeve. This allows the insulating film to come into contact with the shaping piece, and under the action of the shaping piece, it wraps around the end face of the tab, thus achieving efficient and convenient coating of the electrode assembly. Furthermore, because the sleeve comprises both a first cylinder and a second cylinder, the tab coating device is used more frequently. After the protrusion is worn out, to ensure the effectiveness of the insulating film, it is possible to replace the second cylinder without the need to replace the entire sleeve, thereby achieving cost reduction.

In some embodiments, the first cylinder comprises a cylindrical part and a flange plate. The flange plate, along the radial direction, protrudes from one end of the cylindrical part beyond the outer peripheral surface of the cylindrical part. The second cylinder is disc-shaped, and the flange plate is connected to the second cylinder with a fastener.

In the technical solution of the embodiments of the present disclosure, the first cylinder and the second cylinder are connected through the flange, thereby effectively improving the assembly efficiency of the first cylinder and the second cylinder and ensuring the structural strength of the sleeve.

The above description is only an overview of the technical solution of the present disclosure. To provide a clearer understanding of the technical solutions of the present disclosure, it can be implemented according to the content of the summary. In order to make the above and other objectives, features, and advantages of the present disclosure more apparent and understandable, specific embodiments of the present disclosure are provided below.

BRIEF DESCRIPTION OF DRAWINGS

To more clearly illustrate the technical solutions of the embodiments of the present disclosure, the following will briefly introduce the drawings used in the embodiments. It should be understood that the following drawings only show some embodiments of the present disclosure, and therefore they should not be regarded as a limitation on the scope. Those ordinary skilled in the art can also obtain other related drawings based on these drawings without inventive effort.

Figure 1:
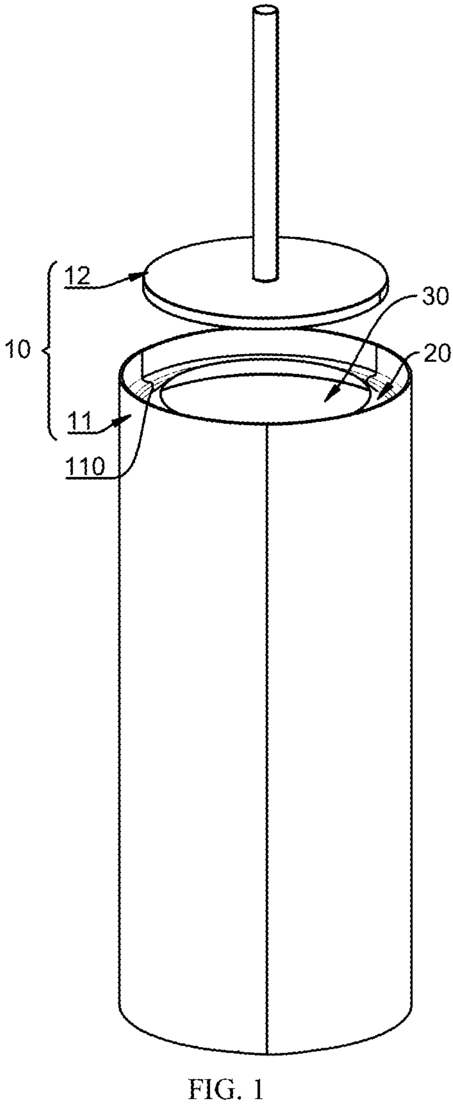
FIG. 1 is a schematic diagram of a tab coating device and an electrode assembly in some embodiments of the present disclosure.

Reference numerals: 10—tab coating device; 11—sleeve; 110—protrusion; 111—module; 12—shaping piece; 120— pressure plate; 121—connecting rod; 20—insulating film; 30—electrode assembly; 31—end face of tab; **11*a*—first cylinder; 11*a*0—cylindrical part; 11*a*1—flange plate; 11*b*—second cylinder; 13—base; 14—resilient member; 112—guide hole; 15—guide pillar; 16—limiting part; 40—rounded rectangle gasket; 41—circular gasket; 1200—supporting disc; 12001—protrusion block; 1201—heating sheet; 12010**—positioning hole.

DETAILED DESCRIPTION OF EMBODIMENTS

In order to make the objective, technical solutions, and advantages of the embodiments of the present disclosure clearer, the following description will provide a clear and comprehensive explanation of the technical solutions in the embodiments of the present disclosure with reference to the drawings. Clearly, the described embodiments are part of the embodiments of the present disclosure and not the entire embodiments. Based on the embodiments in the present disclosure, all other embodiments obtained by those of ordinary skill in the art without making inventive efforts are within the scope of protection of the present disclosure.

Unless otherwise defined, all technical and scientific terms used herein have the same meaning as understood by those skilled in the art of the relevant technical field. The terms used in the summary of the present disclosure are used for the purpose of describing specific embodiments and are not intended to limit the present disclosure. The terms "comprising" and "providing" and their variations, as well as any other variations, are intended to cover non-exclusive inclusion in the summary and the claims of the present disclosure, as well as in the drawings. The terms "first", "second", etc., used in the summary and claims of the present disclosure, or in the above figures, are used to distinguish between different objects and are not intended to describe a specific sequence or hierarchy.

The term "embodiment" used in the present disclosure means that specific features, structures, or characteristics described in conjunction with the embodiment can be included in at least one embodiment of the present disclosure. The use of this phrase in various parts of the summary does not necessarily refer to the same embodiment, nor does it imply that these embodiments are mutually exclusive or independent of each other. Those skilled in the art understand explicitly and implicitly that the embodiments described in the present disclosure can be combined with other embodiments.

In the description of the present disclosure, it should be noted that, unless otherwise clearly stipulated and limited, the terms "provide", "connect", "connection" and "attach" should be understood in a broad sense, for example, it can be a fixed connection, a detachable connection, or an integral connection, and it can be a direct connection, an indirect connection through an intermediary, or an internal communication between two components. Those of ordinary skill in the art can understand the meanings of the above terms in the present disclosure according to specific situations.

In the present disclosure, the term "and/or" is used as a way to describe the relationship between associated objects, indicating that there can be three possible relationships. For example, "A and/or B" can represent: the presence of A, the presence of both A and B, or the presence of B. Additionally, the character "/" in the present disclosure generally represents an "or" relationship between the preceding and following associated objects.

In the present disclosure, the term "multiple" refers to two or more (including two).

The batteries mentioned in the embodiments of the present disclosure refer to a single physical module that comprises one or multiple cylindrical battery cells to provide higher voltage and capacity. For example, the batteries mentioned in the present disclosure can comprise battery modules or battery packs, and so on.

A battery cell comprises an outer shell, an electrode assembly, and an electrolyte. The electrode assembly is composed of positive electrode plates, negative electrode plates, and a separator. The electrode assembly is of a wound structure, consisting of stacked and wound positive electrode sheets, negative electrode sheets, and separator layers. The operation of the battery cell relies on the movement of metal ions between the positive electrode plates and the negative electrode plates. The positive electrode sheet comprises a positive electrode current collector and a positive electrode active material layer. The positive electrode active material layer is coated on the surface of the positive electrode current collector. The positive electrode current collector without the coated positive electrode active material layer protrudes from the one with the coated positive electrode active material layer. The positive electrode current collector without the coated positive electrode active material layer serves as the positive electrode tab. The tab is flattened by the flattening process to form the end face of the tab. In the case of lithium-ion batteries, the material for the positive current collector can be aluminum, and the positive active material can be lithium cobalt oxide, lithium iron phosphate, lithium manganese oxide, lithium nickel cobalt manganese oxide, and so on. The negative electrode sheet comprises a negative electrode current collector and a negative electrode active material layer. The negative electrode active material layer is coated on the surface of the negative electrode current collector. The negative electrode current collector without the coated negative electrode active material layer protrudes from the one with the coated negative electrode active material layer. The negative electrode current collector without the coated negative electrode active material layer serves as the negative electrode tab. The material of the negative current collector can be copper, and the active material of the negative electrode can be carbon or silicon, and so on. The material of the separator can be PP (polypropylene), PE (polyethylene), and so on. The separator has electronic insulation and is configured to isolate adjacent positive and negative electrode plates, preventing short circuits between the adjacent positive and negative electrode plates. The separator is provided with a large number of through micro-pores, ensuring the free passage of electrolyte ions, and it has good permeability for lithium ions. Therefore, the separator basically does not block the passage of lithium ions. The electrode assembly is located inside the casing, and the end face of the tab of the electrode assembly is connected to the electrode lead-out part of the outer shell assembly, thus achieving the output or input of electrical energy.

To prevent the end face of the tab from coming into contact with the casing and causing a short circuit inside the battery cell, an insulating film is arranged between the end face of the tab and the casing, thereby ensuring electrical insulation between the end face of the tab and the casing.

The development of battery technology needs to consider multiple design factors simultaneously, such as energy density, discharge capacity, charge-discharge rates, and other performance parameters. Additionally, the safety of the battery also needs to be taken into consideration.

For a battery cell, one of the factors affecting its safety is the internal short circuit of the battery cell. The inventors have discovered that in existing technology, during the process of forming the end face of the tab of a battery cell through the flattening process, uneven flattening forces can lead to the formation of raised parts on the end face of the tab, where the raised parts are generally located at the edges of the end faces of the tabs. Additionally, the raised parts are not covered by an insulating film, which can easily come into contact with the casing of the battery cell, thereby causing an internal short circuit. Therefore, the safety of the battery is significantly impacted.

In view of this, to enhance the safety of the battery, the inventors conducted in-depth research and designed a tab coating device, configured to coat an insulating film onto the end face of the tab of the electrode assembly. The tab coating device comprises a sleeve and a shaping piece. The sleeve is arranged on the outer peripheral surface of the electrode assembly in a sleeving mode. The shaping piece is moved along the axial direction of the sleeve and inserted into the sleeve, which is capable of pressing the part of the insulating film that exceeds the end face of the tab onto the end face of the tab.

By arranging the sleeve on the electrode assembly in a sleeving mode, the electrode assembly and the insulating film that is arranged on the electrode assembly are constrained. This prevents the insulating film from deforming outward along the radial direction of the electrode assembly when it is pressed down by the shaping piece. It ensures that the part of the insulating film that exceeds the end face of the tab is flattened on the end face of the tab by the shaping piece, thus covering the raised part of the end face of the tab. Therefore, the risk of internal short-circuits in the battery cell is reduced and the safety of the battery is enhanced.

The tab coating device disclosed in embodiments of the present disclosure comprises, but is not limited to, covering the insulating film on the end face of the tab of the electrode assembly and covering the insulating film on the end face of other cylindrical workpieces. The tab coating device disclosed in embodiments of the present disclosure comprises, but is not limited to, being applied in manufacturing equipment for battery cells or devices that flattens the insulating adhesive sheathed on the cylindrical workpiece.

Figures 2, 3:
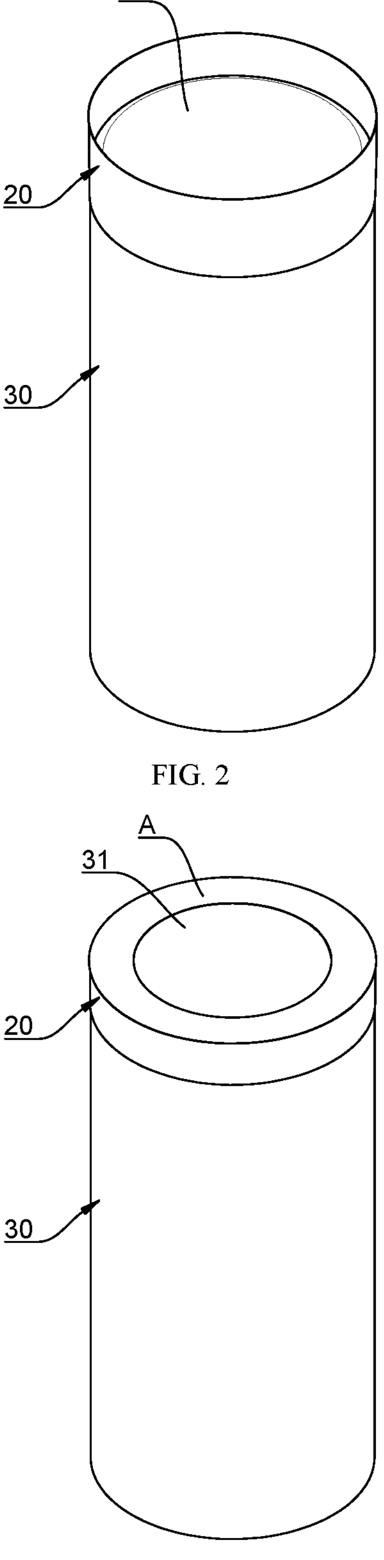
FIG. 2 is a schematic diagram of the electrode assembly and insulating film in some embodiments of the present disclosure.
FIG. 3 is a schematic diagram of the insulating film covering an end face of the tab of the electrode assembly in some embodiments of the present disclosure.
Figure 4:
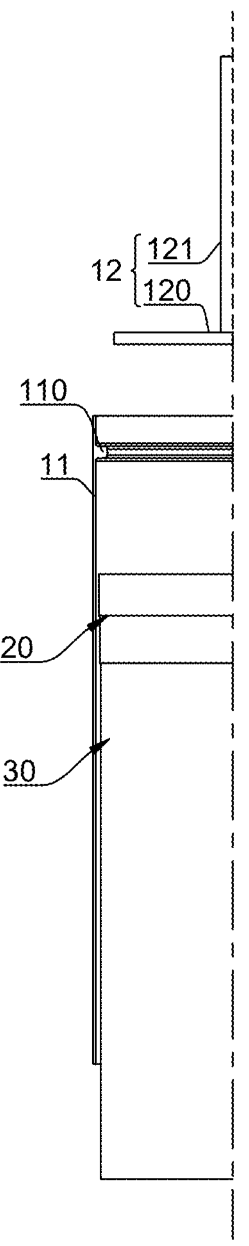
FIG. 4 is a partial sectional view of the tab coating device and the electrode assembly in some embodiments of the present disclosure.

In some embodiments of the present disclosure, referring to FIGS. 1 to 4, FIG. 1 is a schematic diagram of a tab coating device 10 and an electrode assembly 30 in some embodiments of the present disclosure; FIG. 2 is a schematic diagram of the electrode assembly 30 and insulating film 20 in some embodiments of the present disclosure; FIG. 3 is a schematic diagram of the insulating film 20 covering an end face of the tab 31 of the electrode assembly 30 in some embodiments of the present disclosure; and FIG. 4 is a partial sectional view of the tab coating device 10 and the electrode assembly 30 in some embodiments of the present disclosure.

A tab coating device 10, configured to coat the end face of a tab 31 of an electrode assembly 30 with an insulating film 20, comprises a sleeve 11 and a shaping piece 12, wherein the sleeve 11 is configured to be arranged on the outer peripheral surface of the electrode assembly 30 in a sleeving mode. A shaping piece 12 is configured to move along the axial direction of the sleeve 11 and extend into the sleeve 11 to flatten a part of the insulating film 20 that exceeds the end face of the tab 31 on the end face of the tab 31.

Referring to FIG. 2, when the tab coating device 10 is not in operation, the insulating film 20 is arranged on the outer peripheral surface of the electrode assembly 30 in the sleeving mode and is positioned at one end of the electrode assembly 30. A part of the insulating film 20 will extend beyond the end face of the tab 31 of the end face of the tab 31, and the part will be parallel to the central axis of the electrode assembly 30.

Referring to FIG. 3, after the tab coating device 10 is in operation, the part of the insulating film 20 that extends beyond the end face of tab 31 of the electrode assembly 30 will be flattened on the end face of the tab 31, thus covering the edge of the end face of the tab 31, i.e., the raised part of the end face of the tab 31. In FIG. 3, the part of the insulating film 20 that is flattened onto the end face of the tab 31 is indicated at point A.

The sleeve 11 is a component that is arranged on the outer peripheral surface of the electrode assembly 30 in a sleeving mode, that is, the outer peripheral surface of the electrode assembly 30 and the outer peripheral surface of the insulating film 20 are constrained by the sleeve 11. This prevents the insulating film 20 from inclining in the direction away from the central axis of the electrode assembly 30.

The shaping piece 12 is a component capable of moving along the axial direction of the sleeve 11 toward the electrode assembly 30. Through the action of the shaping piece 12, it is possible to flatten the part of the insulating film 20 that exceeds the end face of the tab 31 onto the end face of the tab 31.

The sleeve 11 is arranged around the outer peripheral surface of the electrode assembly 30 in a sleeving mode to constrain the electrode assembly 30 and the insulating film 20 sheathed on the electrode assembly 30, thus preventing any displacement of the electrode assembly 30 and insulating film 20. The part of the insulating film 20 that exceeds the end face of the tab 31 is constrained by the sleeve 11 and, when pressed by the shaping piece 12, can be flattened on the end face of the tab 31 to cover the raised part of the end face of the tab 31. The raised part of the end face of the tab 31 is insulated from the casing of the battery cell, thus preventing any situation where the raised part of the end face of the tab 31 comes into contact with the casing and causes an internal short circuit within the battery cell. This, in turn, enhances the safety of the battery.

Figure 5:
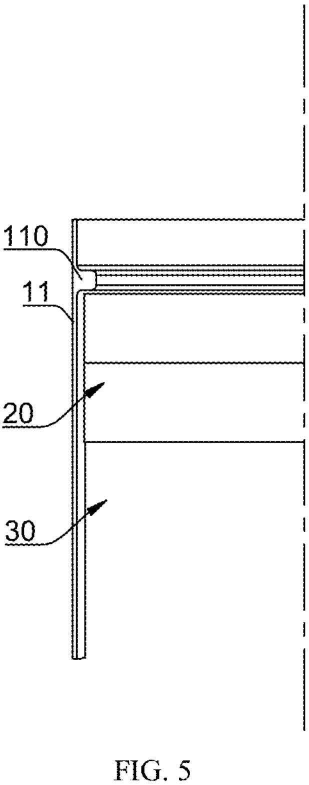
FIG. 5 is a partial sectional view of a sleeve and the electrode assembly in some embodiments of the present disclosure.
Figure 6:
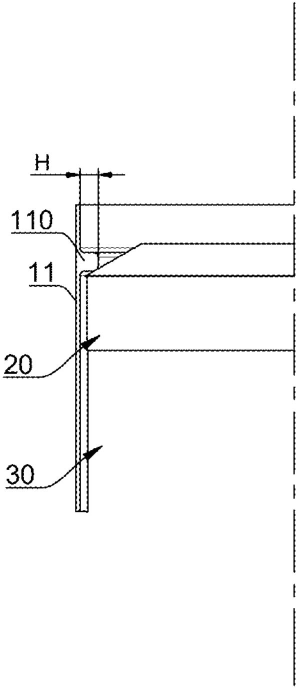
FIG. 6 is a schematic diagram of a protrusion affecting the insulating film in some embodiments of the present disclosure.
Figures 7, 8:
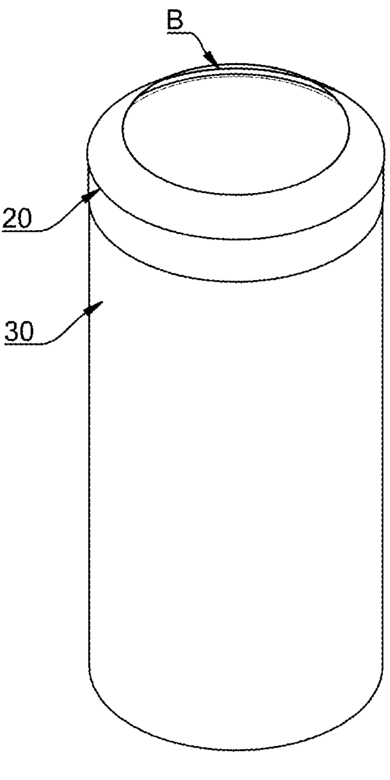
FIG. 7 is a schematic diagram of the insulating film inclining toward a center axis of the electrode assembly in some embodiments of the present disclosure.
FIGS. 8-10 are schematic diagrams of the shaping piece compressing the insulating film on the end face of the tab in some embodiments of the present disclosure.

In some embodiments of the present disclosure, referring to FIGS. 5 to 7, FIG. 5 is a partial sectional view of a sleeve 11 and the electrode assembly 30 in some embodiments of the present disclosure; FIG. 6 is a schematic diagram of a protrusion 110 affecting the insulating film 20 in some embodiments of the present disclosure; and FIG. 7 is a schematic diagram of the insulating film 20 inclining toward a center axis of the electrode assembly 30 in some embodiments of the present disclosure.

The inner wall of the sleeve 11 is formed with a protrusion 110, wherein the protrusion 110 is configured to guide the part of the insulating film 20 that exceeds the end face of the tab 31 to incline toward the central axis of the electrode assembly 30.

The protrusion 110 is a component that protrudes from the inner wall of the sleeve 11. When the sleeve 11 moves along its axis, the protrusion 110 can act on the part of the insulating film 20 that exceeds the end face of the tab 31, thereby causing the part of the insulating film 20 that exceeds the end face of the tab 31 to change from a state parallel to the central axis of the electrode assembly 30 to a state inclined toward the central axis of the electrode assembly 30. The state where the part of the insulating film 20 that exceeds the end face of the tab 31 inclines toward the central axis of the electrode assembly 30 can be seen in FIG. 7 at the position indicated by label B.

As shown in FIGS. 5 and 6, when the sleeve 11 moves along the axis (downward in the figures), the protrusion 110 presses against the part of the insulating film 20 that exceeds the end face of the tab 31, thereby causing the part to deform and incline toward the central axis of the electrode assembly 30.

In the technical solution of the embodiments of the present disclosure, before the shaping piece 12 acts on the insulating film 20, the sleeve 11 moves along the axial direction of the electrode assembly 30. The protrusion 110 presses against the part of the insulating film 20 that exceeds the end face of the tab 31, so that the part of the insulating film 20 that exceeds the end face of the tab 31 is deformed from a state parallel to the central axis of the electrode assembly 30 to a state inclined to the central axis of the electrode assembly 30, that is, inwardly converging toward the center axis of the electrode assembly 30. When the shaping piece 12 compresses the insulating film 20, it ensures that the part of the insulating film 20 that exceeds the end face of the tab 31 is flattened on the end face of the tab 31, thus enabling the raised part of the end face of the tab 31 to be effectively coated by the insulating film 20. This prevents the raised part of the end face of the tab 31 from coming into contact with the casing, thereby enhancing the safety of the battery.

According to some embodiments of the present disclosure, as shown in FIG. 1, the protrusion 110 extends along the inner wall of the sleeve 11 in a circumferential direction.

The protrusion 110 extends along the inner wall of the sleeve 11 in a circumferential direction, which means that the protrusion 110 is ring-shaped and is formed around the central axis of the sleeve 11 in the inner wall of the sleeve 11, which corresponds to the ring-shaped end of the insulating film 20. When the sleeve 11 moves and the protrusion 110 presses down on the end of the insulating film 20 (the part exceeding the end face of the tab 31), any position of the end of the insulating film 20 is allowed to incline toward the central axis of the electrode assembly 30 simultaneously.

In the technical solution of the embodiments of the present disclosure, the protrusion 110 extends along the circumferential direction of the sleeve 11, which means that the protrusion 110, formed in a ring shape, acts circumferentially on the part of the insulating film 20 that exceeds the end face of the tab 31. Therefore, each of the part of the insulating film 20 that exceeds the end face of the tab 31 can be ensured to be inclined toward the central axis of the electrode assembly 30, so that when the shaping piece 12 compresses the insulating film 20, this guarantees that the raised part of the end face of the tab 31 can be effectively coated by the insulating film 20.

In some other embodiments, the protrusion 110 can be block-shaped, and there can be multiple protrusions 110 arranged at intervals along the circumferential direction of the sleeve 11.

According to some embodiments described in the present disclosure, referring to FIG. 6, the protrusion 110 has a protrusion height denoted as H, which satisfies 2 mm≤H≤2.5 mm.

The protrusion height of the protrusion 110 refers to the dimension in which the protrusion 110 extends from the inner wall of the sleeve 11 along the radial direction of the sleeve 11.

In some embodiments, the protrusion height of the protrusion 110 can be 2 mm, 2.1 mm, 2.2 mm, 2.3 mm, or 2.5 mm, among other values.

In the technical solution of the embodiments of the present disclosure, the protrusion 110 has a protrusion height ranging from 2 mm to 2.5 mm, which enables each of the parts of the insulating film 20 that exceeds the end face of the tab 31 can be inclined toward the central axis of the electrode assembly 30, to avoid the insulation film 20 from not being inclined due to insufficient height of the protrusion 110 and to prevent deformation, caused by the excessive height of the protrusion 110, of the insulation film 20 along the direction parallel to the central axis of the electrode assembly 30, thus resulting in an inability to effectively cover the raised part of the end face of the tab 31 or causing a reduction in the area where the insulating film 20 covers the end face of the tab 31.

In some embodiments, the protrusion 110 can be formed with a guiding slope, and the guiding slope is configured to contact the insulating film 20 and effectively guide the part of the insulating film 20 that exceeds the end face of the tab 31 to incline toward the center axis of the electrode assembly 30.

According to some embodiments of the present disclosure, the tab coating device 10 further comprises a first driving member (not shown in the figure). The first drive member is connected to the sleeve 11 and is configured to drive the sleeve 11 to move along its axial direction.

The first driving member is a component that drives the sleeve 11 to move along the axial direction of the sleeve 11. It comprises, but is not limited to, devices capable of producing linear movement, such as a linear motor, cylinder, single-axis robot, and other equipment.

In the technical solution of the embodiments of the present disclosure, through the driving of the first driving member, the sleeve 11 can be moved along its axial direction, thereby pressing against the part of the insulating film 20 that exceeds the end face of the tab 31, and guiding each of the part of the insulating film 20 that exceeds the end face of the tab 31 to incline toward the central axis of the electrode assembly 30.

According to some embodiments of the present disclosure, the tab coating device 10 further comprises a second driving member (not shown in the figure). The second driving member is connected to the shaping piece 12 and is configured to drive the shaping piece 12 to move along the axial direction of the sleeve 11.

The second driving member is a component that drives the shaping piece 12 to move along the axial direction of the sleeve 11. It comprises, but is not limited to, devices capable of producing linear movement, such as a linear motor, cylinder, single-axis robot, and other equipment.

In the technical solution of the embodiments of the present disclosure, driven by the second driving member, the shaping piece 12 can be moved along the axial direction of the sleeve 11 to flatten the part of the insulating film 20 that exceeds the end face of the tab 31 on the end face of the tab 31, thus covering the raised part of the end face of the tab 31. This reduces the risk of internal short circuits of the battery cell, thus enhancing the safety of the battery.

Figure 9:
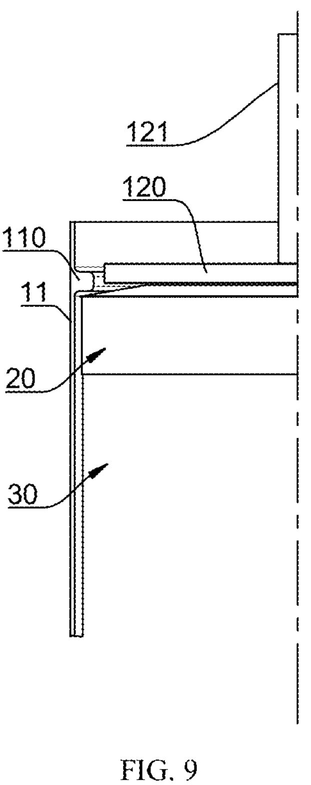
Figure 10:
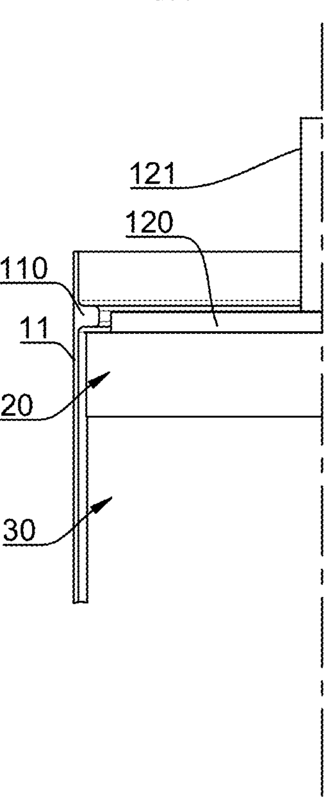

According to some embodiments in the present disclosure, as shown in FIGS. 8 to 10, FIGS. 8 to 10 are schematic diagrams of the shaping piece 12 compressing the insulating film 20 on the end face of the tab 31 in some embodiments of the present disclosure.

The shaping piece 12 comprises a pressure plate 120 and a connecting rod 121. The pressure plate 120 is disc-shaped, and the connecting rod 121 is oriented perpendicularly to the pressure plate 120. One end of the connecting rod 121 is connected to the pressure plate 120, while the other end is connected to the second driving member.

The connecting rod 121 is rod-shaped, with one end connected to the actuator end of the second driving member (for example, when the second driving member is a cylinder, one end of the connecting rod 121 is connected to the extension rod of the cylinder), and the other end connected to the pressure plate 120.

The pressure plate 120 is disc-shaped, and its surface facing the electrode assembly 30 is a flat surface, allowing it to flatten the part of the insulating film 20 that is inclined towards the central axis of the electrode assembly 30 on the end face of the tab 31, thereby ensuring that the insulating film 20 effectively covers the raised part of the end face of the tab 31.

Referring to FIGS. 8 to 10, before the second driving member operates, the part of the insulating film 20 that exceeds the end face of the tab 31 has already been inclined towards the central axis of the electrode assembly 30 due to the action of the protrusion 110. The pressure plate 120 gradually moves downward under the drive of the second drive member, causing the part of the insulating film 20 that exceeds the end face of the tab 31 to further incline until the part of the insulating film 20 that exceeds the end face of the tab 31 is flattened against the end face of the tab 31.

In the technical solution of the embodiments of the present disclosure, the second driving member is connected to the connecting rod 121 to drive the pressure plate 120 to press the part of the insulating film 20 that exceeds the end face of the tab 31. Moreover, the pressure plate, being disc-shaped, is effective in flattening the part of the insulating film 20 that exceeds the end face of the tab 31 on the end face of the tab 31, thus covering the raised part of the end face of the tab 31.

According to some embodiments of the present disclosure, as shown in FIGS. 8 to 10, the diameter of the pressure plate 120 is smaller than the inner diameter of the protrusion 110.

The diameter of the pressure plate 120 is smaller than the inner diameter of the protrusion 110, which means that when the pressure plate 120 is driven by the second driving member to move, it can press the insulating film 20 flat without interfering with the protrusion 110.

In the technical solution of the embodiments of the present disclosure, the diameter of the pressure plate 120 is smaller than the inner diameter of the protrusion 110, which prevents interference between the pressure plate 120 and the protrusion 110 when the pressure plate 120 moves along the central axis of the sleeve 11, thus ensuring effective compression of the insulating film 20.

According to some embodiments of the present disclosure, the shaping piece 12 is a heat-pressing shaping piece, and the heat-pressing shaping piece is configured to heat-press the part of the insulating film 20 that exceeds the end face of the tab 31 on the end face of the tab 31.

The heat-pressing shaping piece refers to a component capable of pressing and heating the part of the insulating film 20 that exceeds the end face of the tab 31 on the end face of the tab 31. The part of the insulating film 20 that is pressed flat against the end face of the tab 31 is heated to harden effectively, thus covering the raised part of the end face of the tab 31. In some embodiments, the heat-pressing shaping piece can be an electrically heated pressing structure, which can be powered to generate heat and heat the insulating film 20.

In the technical solution of the embodiments of the present disclosure, the shaping piece 12 is a heat-pressing shaping piece. By heat-pressing the part of the insulating film 20 that exceeds the end face of the tab 31, it is ensured that the insulating film 20 effectively and consistently covers the raised part of the end face of the tab 31, thereby enhancing the safety of the battery cell.

Figures 11, 12:
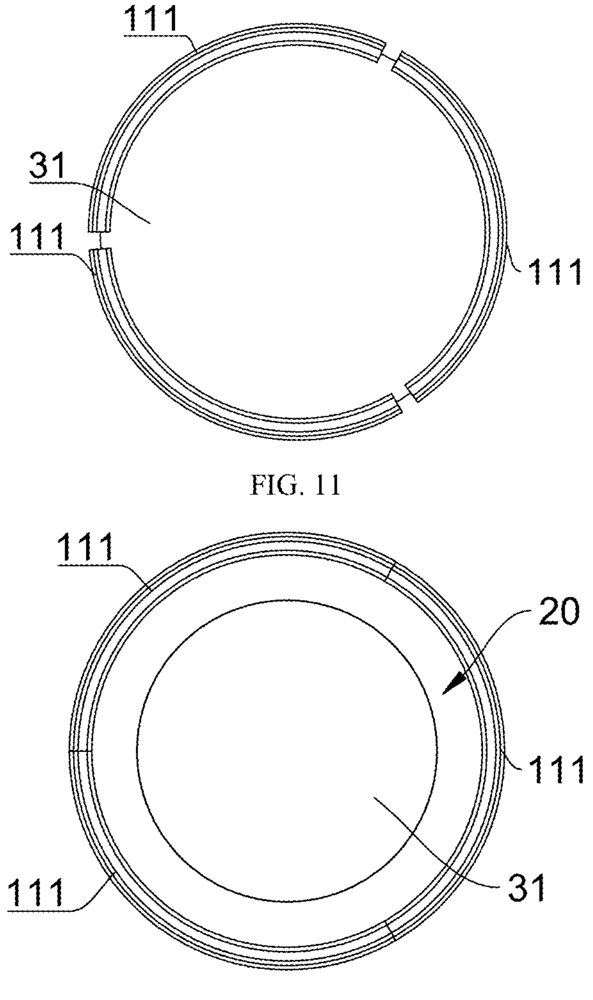
FIG. 11 is a schematic diagram of multiple modules and the electrode assembly in some embodiments of the present disclosure.
FIG. 12 is a schematic diagram of multiple modules in a closed state in some embodiments of the present disclosure.

According to some embodiments in the present disclosure, as shown in FIGS. 11 to 12, FIG. 11 is a schematic diagram of multiple modules 111 and the electrode assembly 30 in some embodiments of the present disclosure; and FIG. 12 is a schematic diagram of multiple modules 111 in a closed state in some embodiments of the present disclosure. The sleeve 11 is assembled from multiple modules 111, and the multiple modules 111 are arranged along the circumferential direction of the sleeve 11.

In FIG. 11, multiple modules 111 are arranged at intervals along the circumference of the electrode assembly 30, wherein the diameter of the circular area enclosed by them is greater than the diameter of the electrode assembly 30 with the insulating film 20 sheathed.

In FIG. 12, multiple modules 111 are closed together, with each module 111 adhering to the outer peripheral surface of the electrode assembly 30. The end faces of two adjacent modules 111 are connected to each other to achieve the sleeving on the electrode assembly 30.

In the embodiments of the present disclosure, there are three modules 111. In other embodiments, the number of modules 111 can be two, four, or five, among others.

In the technical solution of the embodiments of the present disclosure, since the insulating film 20 is arranged on the outer peripheral surface of the electrode assembly 30 in a sleeving mode, the insulating film 20 is able to protrude the electrode assembly 30 along the radial direction of the electrode assembly 30. To avoid damaging the insulating film 20 when the sleeve 11, along the axial direction of the electrode assembly 30, is arranged on the electrode assembly 30 in a sleeving mode, the solution applies a sleeve 11 assembled from multiple modules 111. The multiple modules 111 are arranged along the circumferential direction of the sleeve 11 and can move along the radial direction of the electrode assembly, thus allowing them to be arranged on the electrode assembly 30 in a sleeving mode without damaging the insulating film 20.

According to some embodiments of the present disclosure, the tab coating device 10 further comprises a third driving member (not shown in the figure). The third driving member is connected to multiple modules 111 and is configured to drive each module 111 along the sleeve 11 in a radial direction to either close or open the multiple modules 111.

The third driving member is a component that drives each of the modules 111 along the sleeve 11 in a radial direction. The third driving member, when in operation, can bring the multiple modules 111 together in a tubular shape along the central axis of the sleeve 11 to sheathe the outer peripheral surface of the electrode assembly 30. Alternatively, it can open up the multiple modules 111 to be spaced apart from each other to extract the electrode assembly 30. The third driving member can be in the form of a claw tool to enable synchronous movement of the various modules 111.

In the technical solution of the embodiments of the present disclosure, driven by the third driving member, the multiple modules 111 can be closed together to be arranged on the electrode assembly 30 in a sleeving mode, or the multiple modules 111 can be opened to remove the electrode assembly 30.

According to some embodiments of the present disclosure, as shown in FIGS. 1 to 12, the present disclosure provides a tab coating device 10. A tab coating device 10, configured to coat the end face of a tab 31 of an electrode assembly 30 with an insulating film 20. The tab coating device 10 comprises a sleeve 11 and a shaping piece 12. The sleeve 11 is assembled from multiple modules 111 arranged along the sleeve 11 in a circumferential direction. The multiple modules 111 can be driven along the radial direction of the sleeve 11 by the action of the third driving member to close or open the multiple modules 111. When multiple modules 111 are closed together, a complete cylindrical shape is formed, which can be sheathed around the outer peripheral surface of the electrode assembly 30. Each module 111 is provided with the protrusion block on its inner wall. When the multiple modules 111 are closed together to form a complete sleeve 11, the protrusion blocks on each module 111 are interconnected to create a ring-shaped protrusion 110, wherein the protrusion 110 extends along the circumferential direction of the sleeve 11. The protrusion 110 has a protrusion height of 2 mm to 2.5 mm.

After the sleeve 11 is arranged on the outer peripheral surface of the electrode assembly 30 in a sleeving mode, the first driving member operates to move the sleeve 11 a certain distance along its axial direction (the distance can be set as needed, for example, when the protrusion 110 fully contacts the electrode assembly 30, the sleeve 11 stops moving). This causes the protrusion 110 to press down and act on the part of the insulating film 20 that exceeds the end face of the tab 31, thereby guiding the part to incline toward the central axis of the electrode assembly 30. Subsequently, the second driving member operates, causing the shaping piece 12 to press down, thereby heat-pressing the part of the insulating film 20 that exceeds the end face of the tab 31 onto the end face of the tab 31. Therefore, the part of the insulating film 20 that exceeds the end face of the tab 31 is flattened against the end face of the tab 31 of the electrode assembly 30 in a ring shape to cover the raised part of the electrode assembly 30. In this case, the region of the end face of the tab 31 that is not coated by the insulating film can be the welding area between the end face of the tab 31 and the electrode lead-out part.

Figure 13:
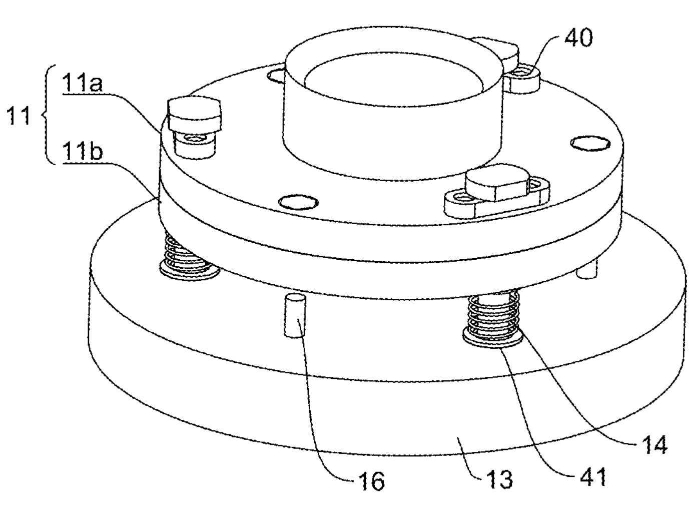
FIG. 13 is a three-dimensional view of the tab coating device in some other embodiments of the present disclosure.
Figure 14:
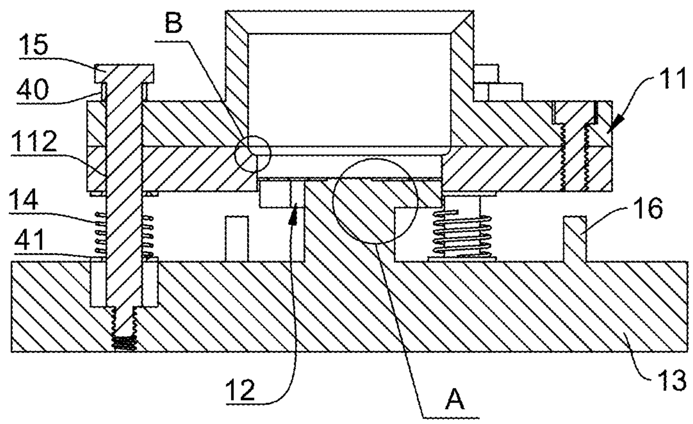
FIG. 14 is a sectional view of the tab coating device in some other embodiments of the present disclosure.

According to other embodiments of the present disclosure, another embodiment of the present disclosure further provides a tab coating device 10. Referring to FIG. 13 and FIG. 14, FIG. 13 is a three-dimensional view of the tab coating device 10 in some other embodiments of the present disclosure, and FIG. 14 is a sectional view of the tab coating device 10 in some other embodiments of the present disclosure.

The tab coating device 10 also comprises a base 13. The shaping piece 12 is fixedly arranged on the base 13, and the sleeve 11 is movably arranged on the base 13 along its axial direction. The shaping piece 12 is located between the base 13 and the sleeve 11.

The base 13 can be a component that supports the shaping piece 12 and the sleeve 11. The shaping piece 12 is fixed on the base 13, and the sleeve 11 is movably arranged on the base 13 along its axial direction so that it can move toward the shaping piece 12 under the action of external force.

In some embodiments, along the axial direction of the sleeve 11, opposite ends of the sleeve 11 are open and both are connected to the interior of the sleeve 11. The electrode assembly 30 (not shown in FIGS. 13 to 20) can be inserted into the sleeve 11 at one end of the sleeve 11 away from the shaping piece 12. The outer peripheral surface of the electrode assembly 30 and the outer peripheral surface of the insulating film 20 are constrained by the sleeve 11. This prevents the insulating film 20 from inclining in the direction away from the central axis of the electrode assembly 30. Under the action of an external force, the sleeve 11 can move towards the shaping piece 12.

In some embodiments, the shaping piece 12 is a component fixed on the base 13, and the part of the insulating film 20 that exceeds the end face of the tab 31 acts on the shaping piece 12 to be flattened on the end face of tab 31 by the shaping piece 12.

In the technical solution of the embodiments of the present disclosure, by arranging a base 13 and securely fixing the shaping piece 12 to the base, and by arranging the sleeve 11 that is movable along its axial direction on the base, it facilitates the operator or a robotic arm to move the electrode assembly 30 and insulating film 20, which are constrained by the sleeve 11, towards the shaping piece 12. This allows the part of the insulating film 20 that exceeds the end face of the tab 31 to be quickly flattened onto the end face of the tab 31 by the shaping piece 12, thereby improving the efficiency of the coating process.

According to other embodiments of the present disclosure, referring to FIG. 13 and FIG. 14. The tab coating device 10 further comprises a resilient member 14. The resilient member 14 is arranged between the sleeve 11 and the base 13 and is configured to apply elastic force in the direction away from the base 13 to the sleeve 11.

The resilient member 14 is a resilient component arranged between the sleeve 11 and the base 13. The resilient member 14 can apply an elastic force in the direction away from the base 13 to the sleeve 11. This means that when external force is applied to move the sleeve 11 towards the shaping piece 12 on the base 13, it needs to overcome the elastic force of the resillient member 14. When no external force is acting on the sleeve 11, the sleeve 11 can return to its original position under the influence of the resilient member 14. Return means to return to the position before the sleeve 11 was moved by force.

In the technical solution of the embodiments of the present disclosure, the electrode assembly 30 can be arranged into the sleeve 11 by opening one end of the sleeve 11 away from the base 13. An operator or a robotic arm can then push the sleeve 11 and/or electrode assembly 30, allowing the electrode assembly 30 to overcome the elastic force of the resilient member 14 and move towards the shaping piece 12, thus flattening the insulating film 20. When the operator or robotic arm releases the pushing force, the sleeve 11 returns to its original position under the action of the resilient member 14. This facilitates the coating of the next electrode assembly 30.

In some embodiments of the present disclosure, referring to FIG. 14, the sleeve 11 is provided with a guide hole 112, and the tab coating device 10 further comprises a guide pillar 15. The guide pillar 15 passes through the guide hole 112 and is slidably coordinated with the sleeve 11 along the axial direction of the sleeve 11. One end of the guide pillar 15 is fixed to the base 13, and the resilient member 14 is arranged on the guide pillar 15 in a sleeving mode.

The guide hole 112 can be a through-hole structure formed in the sleeve 11. The guide pillar 15 can be a columnar component with one end fixed to the base 13 and the other end passing through the guide hole 112, with the axial direction of the guide pillar 15, the axial direction of the guide hole 112, and the axial direction of the sleeve 11 all being parallel to each other. The guide pillar 15 passes through the guide hole 112, allowing the sleeve 11 to slide along the guide pillar 15.

The resilient member 14 can be a spring, and the resilient member 14 is sheathed around the outer circumference of the guide pillar 15. One end of the spring can be connected to the sleeve 11, and the other end of the spring can be connected to the base 13.

The guide hole 112 and guide pillar 15 correspond to each other. In some embodiments, multiple pairs of guide holes 112 and guide pillars 15 can be provided; and the multiple pairs of guide holes 112 and guide pillars 15 can be arranged at evenly intervals along the axial direction of the sleeve 11.

Figure 15:
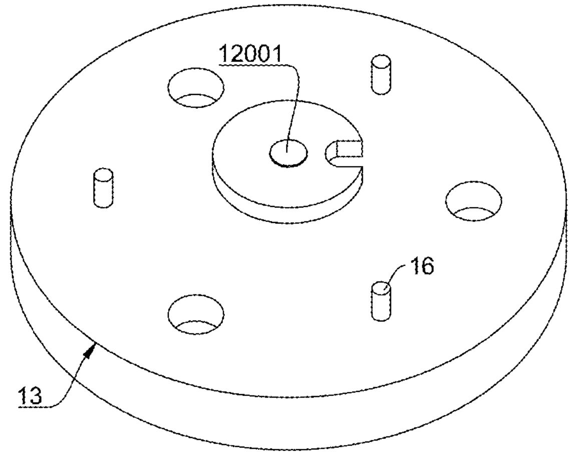
FIG. 15 is a three-dimensional view of a base in some other embodiments of the present disclosure.

Combining FIGS. 13 to 15, FIG. 15 is a three-dimensional view of a base 13 in some other embodiments of the present disclosure. The surface of the sleeve 11 that is away from the base 13 is fixed with a rounded rectangle gasket 40 through bolts. A through-hole is formed in the central of the rounded rectangle gasket 40, wherein the through-hole corresponds to the guide hole 112. The base 13 is provided with a threaded hole formed on the surface facing sleeve 11. The threaded hole, through-hole, and guide hole 112 are coaxial. The guide pillar 15 is a guiding screw, and the resilient member 14 is a spring. One end of the guiding screw is provided with a nut, while the other end of the guiding screw forms threads. The nut abuts against the rounded rectangle gasket 40, and the other end of the guiding screw passes through the spring and circular gasket 41, and is connected with the threaded hole on the base 13 in a manner of a threaded connection.

In the technical solution of the embodiments of the present disclosure, by providing the guide hole 112 and the guide pillar 15, the sleeve 11 moves stably along its axial direction. This, in turn, ensures that the insulating film 20 accurately presses against the shaping piece 12, thus improving the quality of the coating process for the electrode assembly 30.

According to some embodiments of the present disclosure, the tab coating device 10 further comprises a limiting part 16 that protrudes from the surface of the base 13 facing the sleeve 11, which is configured to press against the surface of the sleeve 11 facing the base 13.

The limiting part 16 can be a component protruding from the surface of the base 13 facing the sleeve 11. The limiting part 16 can be cylindrical in structure, with its axial direction parallel to the axial direction of the sleeve 11.

In some embodiments, the limiting part 16 can be made of a material with cushioning properties, i.e., the limiting part 16 is made of rubber.

Referring to FIG. 14, along the direction from the base 13 towards the sleeve 11, the highest point of the limiting part 16 is located below the highest point of the shaping piece 12, i.e., the limiting part 16 does not interfere with the coating of the electrode assembly 30.

In the technical solution of the embodiments of the present disclosure, by providing the limiting part 16, the distance in which the sleeve 11 moves towards the base 13 is restricted, thus preventing the breakage of the sleeve 11 or the electrode assembly 30 constrained by the sleeve 11 due to collision impact with the base 13 or the shaping piece 12. It ensures the longevity of the tab coating device 10 and maintains the safety of the electrode assembly 30.

Figure 16:
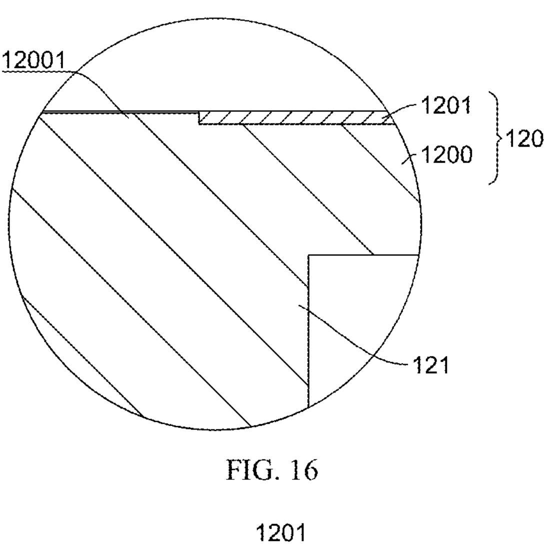
FIG. 16 is an enlarged view of location A in FIG. 14.

According to other embodiments of the present disclosure, referring to FIG. 16, FIG. 16 is an enlarged view of location A in FIG. 14. The shaping piece 12 comprises a pressure plate 120 and a connecting rod 121, wherein the connecting rod 121 is oriented perpendicularly to the pressure plate 120. One end of the connecting rod 121 is connected to the pressure plate 120, while the other end is connected to the base 13.

Along the axial direction of sleeve 11, one end of connecting rod 121 is connected to the base 13, while the other end is connected to the pressure plate 120, causing the pressure plate 120 to protrude from the surface facing the sleeve 11 relative to the base 13. When the sleeve 11 moves towards the base 13, the pressure plate 120 is able to extend into the opening of the sleeve 11 to flatten the insulating film 20.

In some embodiments, the connecting rod 121 is cylindrical, while the pressure plate 120 is disc-shaped. A diameter of the pressure plate 120 is greater than that of the connecting rod 121.

In the technical solution of the embodiments of the present disclosure, the shaping piece 12 has a simple structure, making it easy to manufacture.

Figure 17:
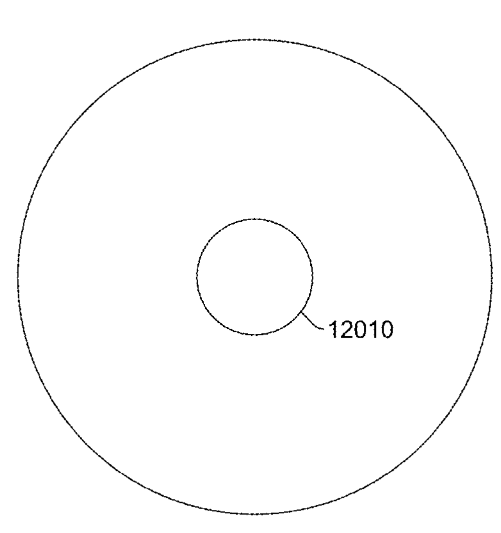
FIG. 17 is a schematic diagram of a heating sheet in some other embodiments of the present disclosure.

According to some other embodiments in the present disclosure, in conjunction with FIGS. 16 and 17, FIG. 17 is a schematic diagram of a heating sheet 1201 in some other embodiments of the present disclosure. The pressure plate 120 comprises a supporting disc 1200 and a heating sheet 1201. The supporting disc 1200 is connected to the connecting rod 121, and the heating sheet 1201 is arranged on the surface of the supporting disc 1200 away from the connecting rod 121. The heating sheet 1201 is configured to heat-press the part of the insulating film 20 that exceeds the end face of the tab 31 onto the end face of the tab 31.

The pressure plate 120 can be a component for supporting the heating sheet 1201. The surface of the pressure plate 120 away from the heating sheet 1201 is connected to the connecting rod 121. The heating sheet 1201 is a component capable of heating the insulating film 20. The heating sheet 1201 can be an electrical heating element and is externally connected to a power source to generate high temperatures.

In the technical solution of the embodiments of the present disclosure, by providing the heating sheet 1201, the part of the insulating film 20 that exceeds the end face of the tab 31 is heat-pressed, which ensures that the insulating film 20 effectively and stably covers the raised part of the end face of the tab 31, thereby enhancing the safety of the battery cell.

According to some other embodiments of the present disclosure, in conjunction with FIGS. 15 to 17, the heating sheet 1201 is disc-shaped, and the center of the heating sheet 1201 forms a positioning hole 12010; and the supporting disc 1200 is formed with a protrusion block 12001, and the protrusion block 12001 is inserted into the positioning hole 12010.

The heating sheet 1201 is disc-shaped, corresponding to the end of the electrode assembly 30, thus ensuring effective heat pressing of the part of the insulating film 20 that exceeds the end face of the tab 31. The protrusion block 12001 is a component that protrudes from the surface of supporting disc 1200 facing the sleeve 11. The protrusion block 12001 can be inserted into the positioning hole 12010 at the center of the heating sheet 1201, thereby stabilizing the heating sheet 1201 on the supporting disc 1200. Referring to FIG. 15, the perimeter wall of the protrusion block 12001 forms a notch, wherein the notch can accommodate the wires of the external power supply for the heating sheet 1201.

In the technical solution of the embodiments of the present disclosure, through the cooperation of the protrusion block 12001 and the positioning hole 12010, it can quickly assemble the heating sheet 1201, thus facilitating the replacement and maintenance of the heating sheet 1201.

Figure 18:
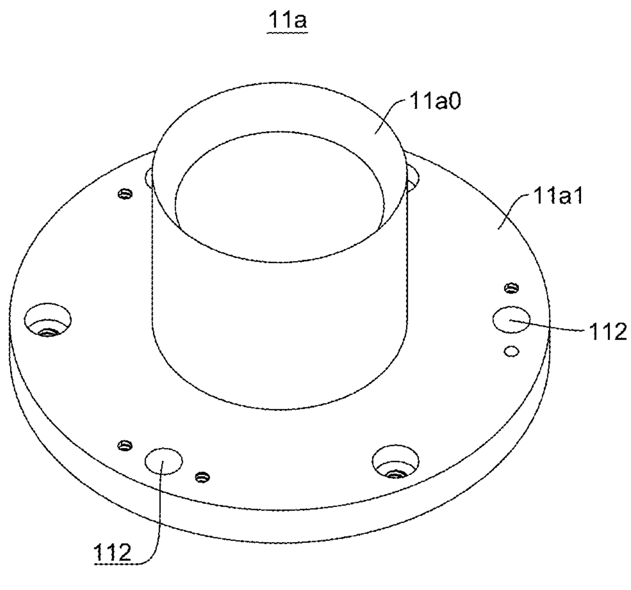
FIG. 18 is a three-dimensional view of a first cylinder in some other embodiments of the present disclosure.
Figure 19:
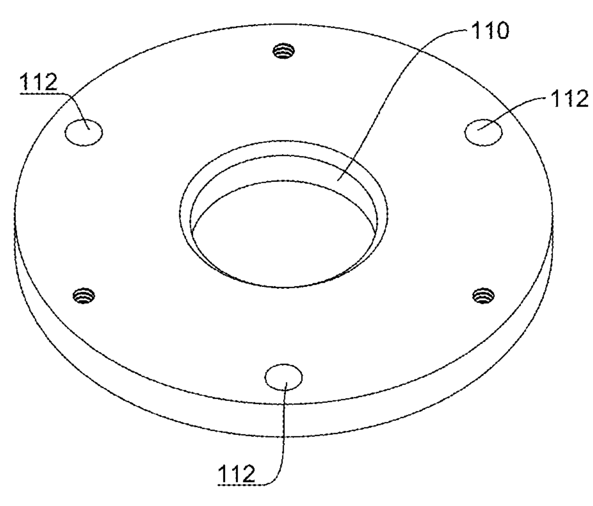
FIG. 19 is a three-dimensional view of a second cylinder in some other embodiments of the present disclosure.
Figure 20:
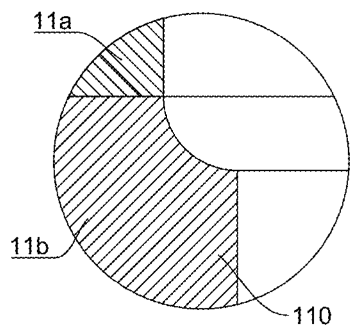
FIG. 20 is an enlarged view of location B in FIG. 14.

According to some other embodiments of the present disclosure, referring to FIG. 13, FIG. 18-FIG. 20, FIG. 18 is a three-dimensional view of a first cylinder **11*a* in some other embodiments of the present disclosure; FIG. 19 is a three-dimensional view of a second cylinder 11***b* in some other embodiments of the present disclosure; and FIG. 20 is an enlarged view of location B in FIG. 14.

The sleeve 11 comprises a first cylinder 11*a* and a second cylinder 11*b*. Along the axial direction of the sleeve 11, the first cylinder 11*a* and the second cylinder 11*b* are connected to each other, wherein the second cylinder 11*b*, compared with the first cylinder 11*a*, is closer to the shaping piece 12. The protrusion 110 is formed on the inner wall of the second cylinder 11*b*.

Along the axial direction of the sleeve 11, the first cylinder 11*a* and the second cylinder 11*b* are both cylindrical structures with open ends at opposite ends. Along the axial direction of the sleeve 11, the first cylinder 11*a* and the second cylinder 11*b* are interconnected and their interiors are in communication with each other. The electrode assembly 30 can be inserted through the opening of the first cylinder 11*a*, thereby entering the interior of the first cylinder 11*a*, and then entering the interior of the second cylinder 11*b*.

The protrusion 110 is a component formed on the inner wall of the second cylinder 11*b*. The protrusion 110 protrudes along the radial direction of the second cylinder 11*b*, thereby causing the inner diameter of the second cylinder 11*b* to decrease at the location of the protrusion 110.

In some embodiments, the protrusion 110 can extend along the circumferential direction of the sleeve 11 and encircle the axis of the sleeve 11.

In the technical solution of the embodiments of the present disclosure, when the electrode assembly 30 is inserted into the sleeve 11 along the axial direction of the sleeve 11, the part of the insulating film 20 that exceeds the end face of the tab 31 is affected by the protrusion 110. On the one hand, the part of the insulating film 20 that exceeds the end face of the tab 31 is deformed from a state parallel to the central axis of the electrode assembly 30 to a state inclined to the central axis of the electrode assembly 30, that is, inwardly converging toward the center axis of the electrode assembly 30. When the shaping piece 12 compresses the insulating film 20, it ensures that the part of the insulating film 20 that exceeds the end face of the tab 31 is flattened on the end face of the tab 31, thus enabling the raised part of the end face of the tab 31 can be effectively coated by the insulating film 20. This prevents the raised part of the end face of the tab 31 from coming into contact with the casing, thereby enhancing the safety of the battery. On the other hand, since the protrusion 110 presses against the end of the electrode assembly 30, the operator or robotic arm can continue to apply force in the same direction after inserting the electrode assembly 30 into the sleeve 11. This allows the insulating film 20 to come into contact with the shaping piece 12, and under the action of the shaping piece 12, it wraps around the end face of the tab 31, thus achieving efficient and convenient coating of the electrode assembly 30. Furthermore, because the sleeve 11 comprises both a first cylinder 11*a* and a second cylinder 11*b*, when the tab coating device 10 is used continuously, after the protrusion 110 is worn out, to ensure the effectiveness of the insulating film 20, it is possible to replace the second cylinder 11*b* without the need to replace the entire sleeve 11, thereby achieving cost reduction.

According to some embodiments of the present disclosure, in conjunction with FIGS. 18 and 19, the first cylinder 11*a* comprises a cylindrical part 11*a*0 and a flange plate 11*a*1. The flange plate 11*a*1, along the radial direction, protrudes from one end of the cylindrical part 11*a*0 beyond the outer peripheral surface of the cylindrical part 11*a*0. The second cylinder 11*b* is disc-shaped, and the flange plate 11*a*1 is connected to the second cylinder 11*b* with a fastener.

The cylindrical part 11*a*0 forms therein a channel for the electrode assembly 30 to pass through. The flange plate 11*a*1 is a part protruding from the outer peripheral surface of the cylindrical part 11*a*0, and a first screw hole is formed on the flange plate 11*a*1. The diameter of the second cylinder 11*b* corresponds to the diameter of the flange plate 11*a*1, and the portion of the second cylinder 11*b* corresponding to the flange plate 11*a*1 forms a second screw hole. The fastener can be a bolt, and the fastener can pass through the first screw hole to connect to the second screw hole.

In the technical solution of the embodiments of the present disclosure, the first cylinder 11*a* and the second cylinder 11*b* are connected through the flange, thereby effectively improving the assembly efficiency of the first cylinder 11*a* and the second cylinder 11*b* and ensuring the structural strength of the sleeve 11.

According to some further embodiments of the present disclosure, referring to FIGS. 13 to 20. The tab coating device 10 comprises a sleeve 11, a shaping piece 12, a base 13, a resilient member 14, and a guide pillar 15. The sleeve 11 comprises a first cylinder 11*a* and a second cylinder 11*b*. The first cylinder 11*a* is connected to the second cylinder 11*b* via a flange plate 11*a*1. The inner wall of the second cylinder 11*b* forms a protrusion 110, and protrusion 110 extends along the axial direction of the second cylinder 11*b* for one full circle. The flange plate 11*a*1 and the surface of the second cylinder 11*b* are provided with a guide hole 112. The guide pillar 15 passes through the guide hole 112 and is secured to the base 13. The resilient member 14 is arranged on the guide pillar 15 in a sleeving mode and is positioned between the base 13 and the second cylinder 11*b*. The resilient member 14 provides elastic force for the sleeve 11 in the direction away from the base 13. The sleeve 11 can move in the axial direction of the sleeve 11 along the guide pillar 15 and, under external force, can overcome the elastic force of the resilient member 14 to move towards the base 13. The shaping piece 12 is fixedly arranged on the surface of the base 13 facing the sleeve 11. The shaping piece 12 is located between the base 13 and the sleeve 11. The shaping piece 12 comprises a supporting disc 1200, a heating sheet 1201, and a connecting rod 121. One end of the connecting rod 121 is fixed to the base 13, and the other end of the connecting rod 121 is connected to the supporting disc 1200. The heating sheet 1201 is fixed to the supporting disc 1200.

When using the tab coating device 10, the base 13 is located below the sleeve 11, and the electrode assembly 30 is inserted into the end of the sleeve 11 which is away from the base 13. The sleeve 11 restricts the position of the electrode assembly 30, keeping it upright. The electrode assembly 30 moves downward due to its own weight and external forces until it reaches the protrusion 110 inside the second cylinder 11*b*, and the insulating film 20 is closed inwardly under the action of the protrusion 110. Simultaneously, under the influence of its own weight and external forces, the electrode assembly 30 and the sleeve 11 continue to move downward to the shaping piece 12 on the base 13. The insulating film 20 comes into contact with the heating sheet 1201, and further pressure is applied to make the contact between the insulating film 20 and the heating sheet 1201 even tighter. During this process, the part of the insulating film 20 that exceeds the end face of the tab 31 is flattened onto the end face of the tab 31, thus completing the coating of the electrode assembly 30.

The above is only a preferred embodiment of the present disclosure, which is not intended to limit, and the present disclosure may have various changes and variations for those skilled in the art. Any modification, equivalent substitution, improvement, etc. made within the spirit and principles of the present disclosure shall be included in the scope of protection of the present disclosure.

What is claimed is:

1. A tab coating device, configured to coat an end face of a tab of an electrode assembly with an insulating film, wherein the tab coating device comprises:

a sleeve, configured to be arranged on an outer peripheral surface of the electrode assembly in a sleeving mode, wherein the sleeve is provided with a guide hole;

a shaping piece, configured to move along an axial direction of the sleeve and extend into the sleeve to flatten a part of the insulating film that exceeds the end face of the tab on the end face of the tab;

a base, wherein the shaping piece is fixedly arranged on the base, the sleeve is movably arranged on the base along its axial direction, the shaping piece is located between the base and the sleeve;

a resilient member arranged between the sleeve and the base and configured to apply an elastic force in a direction away from the base to the sleeve; and a guide pillar passing through the guide hole and slidably coordinated with the sleeve along the axial direction of the sleeve, wherein one end of the guide pillar is fixed to the base, and the resilient member is arranged on the guide pillar in a sleeving mode.

2. The tab coating device according to claim 1, wherein an inner wall of the sleeve is formed with a protrusion, and the protrusion is configured to guide the part of the insulating film that exceeds the end face of the tab to incline toward a central axis of the electrode assembly.

3. The tab coating device according to claim 2, wherein the protrusion extends along a circumferential direction of the sleeve.

4. The tab coating device according to claim 2, wherein the protrusion has a protrusion height H, which satisfies: 2 mm≤H≤2.5 mm.

5. The tab coating device according to claim 1, wherein the shaping piece is a heat-pressing shaping piece, and the heat-pressing shaping piece is configured to heat-press the part of the insulating film that exceeds the end face of the tab on the end face of the tab.

6. The tab coating device according to claim 1, wherein the tab coating device further comprises:

a limiting part that protrudes from a surface of the base facing the sleeve, which is configured to press against a surface of the sleeve facing the base.

7. The tab coating device according to claim 1, wherein the shaping piece comprises a pressure plate and a connecting rod, and the connecting rod is oriented perpendicularly to the pressure plate; and one end of the connecting rod is connected to the pressure plate, while the other end is connected to the base.

8. The tab coating device according to claim 7, wherein the pressure plate comprises a supporting disc and a heating sheet, and the supporting disc is connected to the connecting rod; and the heating sheet is arranged on a surface of the supporting disc away from the connecting rod; and the heating sheet is configured to heat-press the part of the insulating film that exceeds the end face of the tab onto the end face of the tab.

9. The tab coating device according to claim 8, wherein the heating sheet is disc-shaped, and a center of the heating sheet forms a positioning hole; and the supporting disc is formed with a protrusion block, and the protrusion block is inserted into the positioning hole.

10. The tab coating device according to claim 2, wherein the sleeve comprises a first cylinder and a second cylinder, along an axial direction of the sleeve, the first cylinder and the second cylinder are connected to each other, wherein the second cylinder, compared with the first cylinder, is closer to the shaping piece; and the protrusion is formed on an inner wall of the second cylinder.

11. The tab coating device according to claim 10, wherein the first cylinder comprises a cylindrical part and a flange plate; the flange plate, along a radial direction, protrudes from one end of the cylindrical part beyond an outer peripheral surface of the cylindrical part; and the second cylinder is disc-shaped, and the flange plate is connected to the second cylinder with a fastener.

12. A tab coating device, configured to coat an end face of a tab of an electrode assembly with an insulating film, wherein the tab coating device comprises:

a base;

a sleeve configured to be arranged on an outer peripheral surface of the electrode assembly in a sleeving mode and movably arranged on the base along an axial direction; and a shaping piece located between the base and the sleeve, wherein the shaping piece is fixedly arranged on the base and configured to move along an axial direction of the sleeve and extend into the sleeve to flatten a part of the insulating film that exceeds the end face of the tab on the end face of the tab, wherein the shaping piece comprises a pressure plate and a connecting rod, the connecting rod is oriented perpendicularly to the pressure plate and has two ends, one end is connected to the pressure plate, the other end is connected to the base, the pressure plate comprises a heating sheet and a supporting disc connected to the connecting rod, wherein the heating sheet is arranged on a surface of the supporting disc away from the connecting rod and configured to heat-press a part of the insulating film that exceeds the end face of the tab onto the end face of the tab, the heating sheet is disc-shaped, a center of the heating sheet forms a positioning hole, the supporting disc is formed with a protrusion block inserted into the positioning hole.

13. A tab coating device, configured to coat an end face of a tab of an electrode assembly with an insulating film, wherein the tab coating device comprises:

a sleeve configured to be arranged on an outer peripheral surface of the electrode assembly in a sleeving mode; and a shaping piece, configured to move along an axial direction of the sleeve and extend into the sleeve to flatten a part of the insulating film that exceeds the end face of the tab on the end face of the tab, wherein the sleeve comprises a first cylinder and a second cylinder connected to each other, the second cylinder along an axial direction of the sleeve, the second cylinder is closer to the shaping piece compared with the first cylinder, an inner wall of the second cylinder of the sleeve is formed with a protrusion configured to guide the part of the insulating film that exceeds the end face of the tab to incline toward a central axis of the electrode assembly, wherein the first cylinder comprises a cylindrical part and a flange plate, the flange plate, along a radial direction, protrudes from one end of the cylindrical part beyond an outer peripheral surface of the cylindrical part; the second cylinder is disc-shaped, the flange plate is connected to the second cylinder with a fastener.

* * * * *